(12) United States Patent
Aizawa et al.

(10) Patent No.: US 11,300,943 B2
(45) Date of Patent: Apr. 12, 2022

(54) SIMULATION DEVICE, NUMERICAL CONTROL DEVICE, AND SIMULATION METHOD

(71) Applicant: FANUC CORPORATION, Yamanashi (JP)

(72) Inventors: Nobuaki Aizawa, Yamanashi (JP); Wei Zhao, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/012,546

(22) Filed: Sep. 4, 2020

(65) Prior Publication Data

US 2021/0132581 A1 May 6, 2021

(30) Foreign Application Priority Data

Oct. 31, 2019 (JP) .............................. JP2019-198584

(51) Int. Cl.
   *G05B 19/4069* (2006.01)
   *G05B 19/402* (2006.01)
(52) U.S. Cl.
   CPC ....... *G05B 19/4069* (2013.01); *G05B 19/402* (2013.01); *G05B 2219/33301* (2013.01)
(58) Field of Classification Search
   CPC .............. G05B 19/4069; G05B 19/402; G05B 2219/33301
   See application file for complete search history.

(56) References Cited

U.S. PATENT DOCUMENTS

| 5,917,726 | A | * | 6/1999 | Pryor ............... | G05B 19/41875 |
| | | | | | 700/95 |
| 6,438,445 | B1 | * | 8/2002 | Yoshida ........... | G05B 19/40937 |
| | | | | | 700/173 |
| 2012/0283862 | A1 | * | 11/2012 | Nonaka .................. | G05B 19/19 |
| | | | | | 700/97 |
| 2019/0266296 | A1 | * | 8/2019 | Aizawa ............. | G05B 19/4097 |
| 2020/0166906 | A1 | * | 5/2020 | Wang ................. | G05B 19/4069 |
| 2021/0096534 | A1 | * | 4/2021 | Katsumoto ........ | G05B 19/4062 |

FOREIGN PATENT DOCUMENTS

JP     2011-141673     7/2011

* cited by examiner

*Primary Examiner* — Ronald D Hartman, Jr.
(74) *Attorney, Agent, or Firm* — Wenderoth, Lind & Ponack, L.L.P.

(57) ABSTRACT

To provide easy determination of a causative factor of a machining problem in a machining target or easy checking of the effectiveness of an adjustment of, e.g., a machining program, a control command such as a position command, a servo control, or machine operation. This invention includes: storage units storing pieces of machining position data obtained from machining performed based on at least two of a machining program, a control command for performing servo control on a servo motor for driving a machine tool, and pieces of feedback information related to the servo control and machine operation, the machining being performed on a machining target by the machine tool; a machined surface simulation unit performing machined surface simulations based on the stored machining position data; and a display unit displaying images of machined surfaces resulting from the machined surface simulations in a juxtaposed manner.

11 Claims, 9 Drawing Sheets

OBSERVATION TARGET LOCATION

FIG. 10
SIMULATION RESULTS
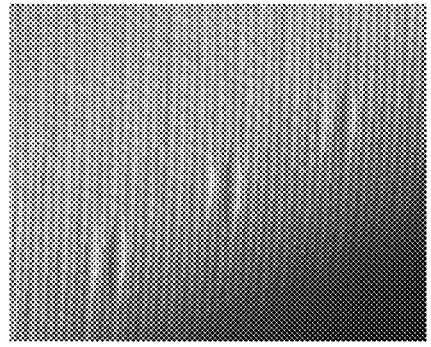
STORAGE UNIT 111
BEFORE ADJUSTMENT OF
ACCELERATION/DECELERATION
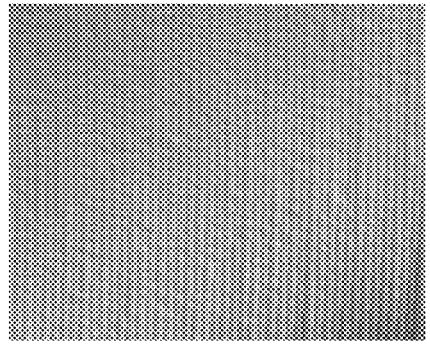
STORAGE UNIT 112
AFTER ADJUSTMENT OF
ACCELERATION/DECELERATION
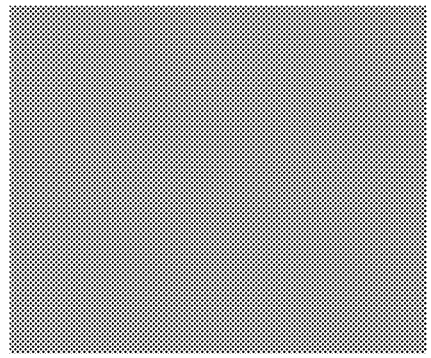
STORAGE UNIT 113
N/A
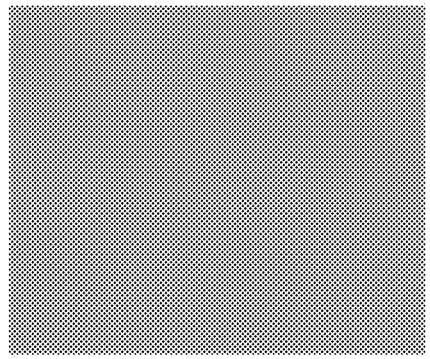
STORAGE UNIT 114
N/A

SIMULATION DEVICE, NUMERICAL CONTROL DEVICE, AND SIMULATION METHOD

This application is based on and claims the benefit of priority from Japanese Patent Application No. 2019-198584, filed on 31 Oct. 2019, the content of which is incorporated herein by reference.

BACKGROUND OF THE INVENTION

Field of the Invention

The present invention relates to a simulation device, a numerical control device, and a simulation method, and more specifically to a simulation device, a numerical control device, and a simulation method for performing a simulation of a machined surface of a machining target that is to be machined by a machine tool.

Related Art

Heretofore, there has been known a machining simulation device and a numerical control device capable of determining a machining failure and facilitating estimation of a causative factor of the machining failure (see Patent Document 1, for example). Patent Document 1 discloses a configuration including: a cutting simulation unit for simulating the shape of a workpiece expressed by a distance field model; a comparison target selecting unit for selecting a comparison target shape from the simulation result; a shape drawing processing unit for executing rendering processing for displaying the simulation result with graphics; and a simulation execution control unit. In the rendering processing, assuming a projection face on which pixels are arrayed, a light beam emitted from each of the pixels on the projection face in a projecting direction perpendicular to the projection face, and a position of an intersection of the comparison target shape and the light beam intersect, the shape drawing processing unit determines, at the position of the intersection, a luminance value of each of the pixels based on a signed distance value with respect to a reference standard shape and a difference between secondary geometrical feature values that can be derived from a distance field.

Patent Document 1: Japanese Unexamined Patent Application, Publication No. 2011-141673

SUMMARY OF THE INVENTION

In order to machine a machining target (workpiece) with use of a machine tool, a series of processes is performed. Specifically, the series of processes includes a process of creating a machining program in a CAD (Computer Aided Design) and/or a CAM (Computer Aided Manufacturing), a process of performing, by a numerical control device, acceleration/deceleration control and/or the like according to the machining program to generate a control command such as a position command, and a process of driving a motor by feedback control performed by a servo control device so that the machine tool is driven by the motor. In case an abnormality occurs on a machined surface of the workpiece machined by the machine tool, it is necessary to determine which of the factors, i.e., the machining program, the control command such as the position command, the servo control performed by the servo control device, and the machine operation has caused the abnormality.

One simulation method that can be effectively used to determine the causative factor is a simulation of a machined surface. With the simulation of the machined surface, a machined surface resulting from a simulation can be compared with a machined surface of a workpiece that has been actually machined, advantageously.

In the case of performing machined surface simulations based on the machining program, the control command such as the position command, the servo control, and the machine operation and determining which of these factors has caused an abnormality on the machined surface of a machined workpiece, it is desirable that the procedures therefor be made as efficient as possible in order to reduce time and effort. In addition, in a case where any of the machining program, the control command such as the position command, the servo control, and the machine operation is adjusted, it is desirable that the effectiveness of the adjustment be checked easily.

(1) A simulation device according to a first aspect of the present disclosure is a simulation device including: plural storage units configured to store pieces of machining position data obtained from at least two of a machining program, a control command for performing servo control on a servo motor configured to drive a machine tool, and pieces of feedback information from the servo motor and the machine tool, which are for the machine tool to perform machining on a machining target;
a machined surface simulation unit configured to perform machined surface simulations based on the pieces of machining position data having been stored; and
a display unit configured to display images of machined surfaces in a juxtaposed manner, the images of the machined surfaces being obtained as a result of the machined surface simulations.

(2) A simulation device according to a second aspect of the present disclosure is a simulation device including: plural storage units configured to store plural pieces of machining position data obtained from one of a machining program, a control command for performing servo control on a servo motor configured to drive a machine tool, and pieces of feedback information from the servo motor and the machine tool, which are for the machine tool to perform machining on a machining target more than once under different conditions; a machined surface simulation unit configured to perform plural machined surface simulations based on the plural pieces of machining position data having been stored; and a display unit configured to display images of machined surfaces in a juxtaposed manner, the images of the machined surfaces being obtained as a result of the plural machined surface simulations.

(3) A numerical control device according to a third aspect of the present disclosure is a numerical control device including: a simulation device of (1) or (2); and a control unit configured to generate a control command for performing servo control on a servo motor according to a machining program.

(4) A simulation method according to a fourth aspect of the present disclosure is a simulation method using a simulation device (110, 110A) that includes plural storage units (111 to 114) configured to store plural pieces of machining position data obtained from at least two of a machining program, a control command for performing servo control on a servo motor (300) configured to drive a machine tool (400), and pieces of feedback information from the servo motor (300) and the machine tool (400), which are for the machine tool (400) to perform machining on a machining target, the simulation method including:

performing plural machined surface simulations based on the plural pieces of machining position data having been stored; and displaying images of machined surfaces in a juxtaposed manner, the images of the machined surfaces being obtained as a result of the plural machined surface simulations.

(5) A simulation method according to a fifth aspect of the present disclosure is a simulation method using a simulation device (110, 110A) that includes plural storage units (111 to 114) configured to store plural pieces of machining position data obtained from one of a machining program, a control command for performing servo control on a servo motor (300) configured to drive a machine tool (400), and pieces of feedback information from the servo motor (300) and the machine tool (400), which are for the machining tool (400) to perform machining on a machining target more than once under different conditions, the simulation method including: performing machined surface simulations based on the pieces of machining position data having been stored; and displaying images of machined surfaces in a juxtaposed manner, the images of the machined surfaces being obtained as a result of the machined surface simulations.

According to some aspects of the present disclosure, in the case of determining, by means of a machined surface simulation, the causative factor of an abnormality on a machined surface of a machined workpiece from among a plurality of factors, i.e., a machining program, a control command for performing servo control on a servo motor configured to drive a machine tool, the servo control, and machine operation, it is possible to easily determine the causative factor. According to some aspects of the present disclosure, in the case of adjusting any of a machining program, a control command for performing servo control on a servo motor configured to drive the machine tool, the servo control, and machine operation and checking the effectiveness of the adjustment by means of a machined surface simulation, it is possible to easily check the effectiveness of the adjustment.

BRIEF DESCRIPTION OF THE DRAWINGS

FIG. 10 is a view of the screen displaying the results of machined surface simulations.

DETAILED DESCRIPTION OF THE INVENTION

The following will give a detailed description of embodiments of the present invention with reference to the drawings.

First Embodiment

Figure 1:
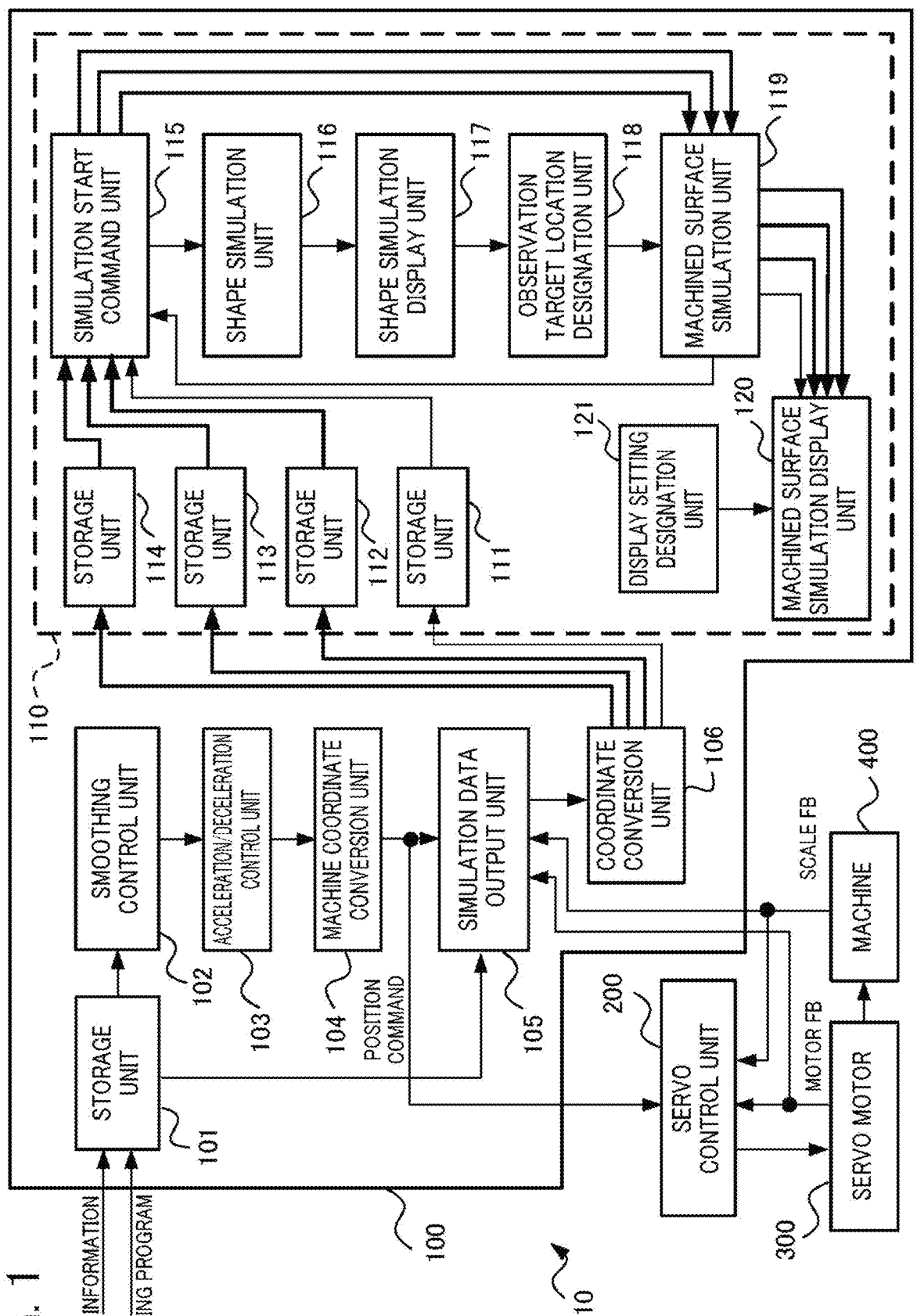
FIG. 1 is a block diagram showing one example of a configuration of a numerical control machine system including a numerical control device according to a first embodiment of the present invention.

FIG. 1 is a block diagram showing one example of a configuration of a numerical control machine system including a numerical control device according to a first embodiment of the present invention. The numerical control machine system (hereinafter, referred to as an NC machine system) 10 shown in FIG. 1 includes a numerical control device (hereinafter, referred to as an NC device) 100, a servo control unit 200, a servo motor 300, and a machine 400. The machine 400 is a machine tool for performing a cutting work and the like. The NC device 100 may be included in the machine 400. The servo motor 300 may also be included in the machine 400. In a case where the machine 400 has a plurality of axes, e.g., three axes of an X-axis, a Y-axis, a Z-axis, the servo control unit 200 and the servo motor 300 are provided for each of the axes.

The NC device 100 includes a storage unit 101, a smoothing control unit 102, an acceleration/deceleration control unit 103, a machine coordinate conversion unit 104, a simulation data output unit 105, a coordinate conversion unit 106, and a simulation unit 110. The simulation unit 110 constitutes a simulation device.

The storage unit 101 stores a machining program including a command route (arrangement of command points) indicating a machining route to be inputted and tool information to be inputted. The machining program is created with use of CAD (Computer Aided Design) and CAM (Computer Aided Manufacturing). The machining program and the tool information are read from the storage unit 101 according to a machining execution command, and are inputted to the smoothing control unit 102 and the simulation data output unit 105. The machining program includes the command route indicating the machining route, which corresponds to machining position data.

The smoothing control unit 102 performs smoothing control on a movement route according to a movement command indicated by the machining program. Specifically, the smoothing control unit 102 performs compensation on the movement command into a smooth route, and then interpolates points on the movement route after the compensation at an interpolation period (path compensation).

The acceleration/deceleration control unit 103 generates a movement speed pattern according to the movement command interpolated by the smoothing control unit 102, an acceleration/deceleration set based on an acceleration/deceleration time constant, and a maximum speed. Then, the acceleration/deceleration control unit 103 generates a position command based on the movement speed pattern, and outputs the position command to the machine coordinate conversion unit 104. The smoothing control unit 102 and the acceleration/deceleration control unit 103 serve as a control unit for generating a control command for performing servo control on the servo motor 300. The position command serves as a control command for performing the servo control on the servo motor 300 configured to drive the machine tool.

The machine coordinate conversion unit 104 converts work coordinates of the position command outputted from the acceleration/deceleration control unit 103 into machine coordinates. Then, the machine coordinate conversion unit 104 outputs, to the servo control unit 200 and the simulation data output unit 105, the position command including the machine coordinates obtained as a result of the conversion.

The simulation data output unit 105 outputs, to the coordinate conversion unit 106, the machining position data of the machining program outputted from the storage unit 101, the position command (serving as the machining position data) outputted from the machine coordinate conversion unit 104, machining position data that is motor feedback information (shown as motor FB) serving as first feedback information outputted from the servo motor 300, and machining position data that is scale feedback information (shown as scale FB) serving as second feedback information outputted from the machine 400.

The coordinate conversion unit 106 converts the four pieces of machining position data outputted from the simulation data output unit 105 into pieces of machining position data in a common coordinate system. Then, the coordinate conversion unit 106 outputs, to storage units 111 to 114, the pieces of machining position data obtained as a result of the conversion. Specifically, in a case where the common coordinate system is the machine coordinate system, the coordinate conversion unit 106 converts the machining position data of the machining program, which is in the work coordinate system, into machining position data in the machine coordinate system. Then, the coordinate conversion unit 16 stores the machining position data in the machine coordinate system in the storage unit 111. Since the machining position data outputted from the machine coordinate conversion unit 104 is in the machine coordinate system, the coordinate conversion unit 106 stores, in the storage unit 112, the machining position data outputted from the machine coordinate conversion unit 104 without making any changes. In addition, since the pieces of machining position data outputted from the servo motor 300 and the machine 400 are incremental data, the coordinate conversion unit 106 stores these pieces of machining position data for a period starting from the start of the machining, converts these pieces of machining position data into pieces of machining position data in the machine coordinate system, and stores, in the storage units 113 and 114, the pieces of machining position data obtained as a result of the conversion.

The servo control unit 200 calculates a position deviation that is a difference between the position command having been inputted and a position detection value of at least one of the motor feedback information and the scale feedback information. Based on the position deviation, the servo control unit 200 generates a speed command. Then, based on the speed command, the servo control unit 200 generates a torque command and outputs it to the servo motor 300. The motor feedback information is a position detection value obtained from a rotary encoder associated with the servo motor 300, whereas the scale feedback information is a position detection value obtained from a linear scale provided to the machine 400. The servo control unit 200 does not necessarily have to perform the feedback control with use of the two pieces of information, i.e., the motor feedback information from the servo motor 300 and the scale feedback information from the machine 400. Alternatively, for example, the scale feedback information may not be supplied to the servo control unit 200, but may be supplied to the coordinate conversion unit 106 only.

Figure 2:
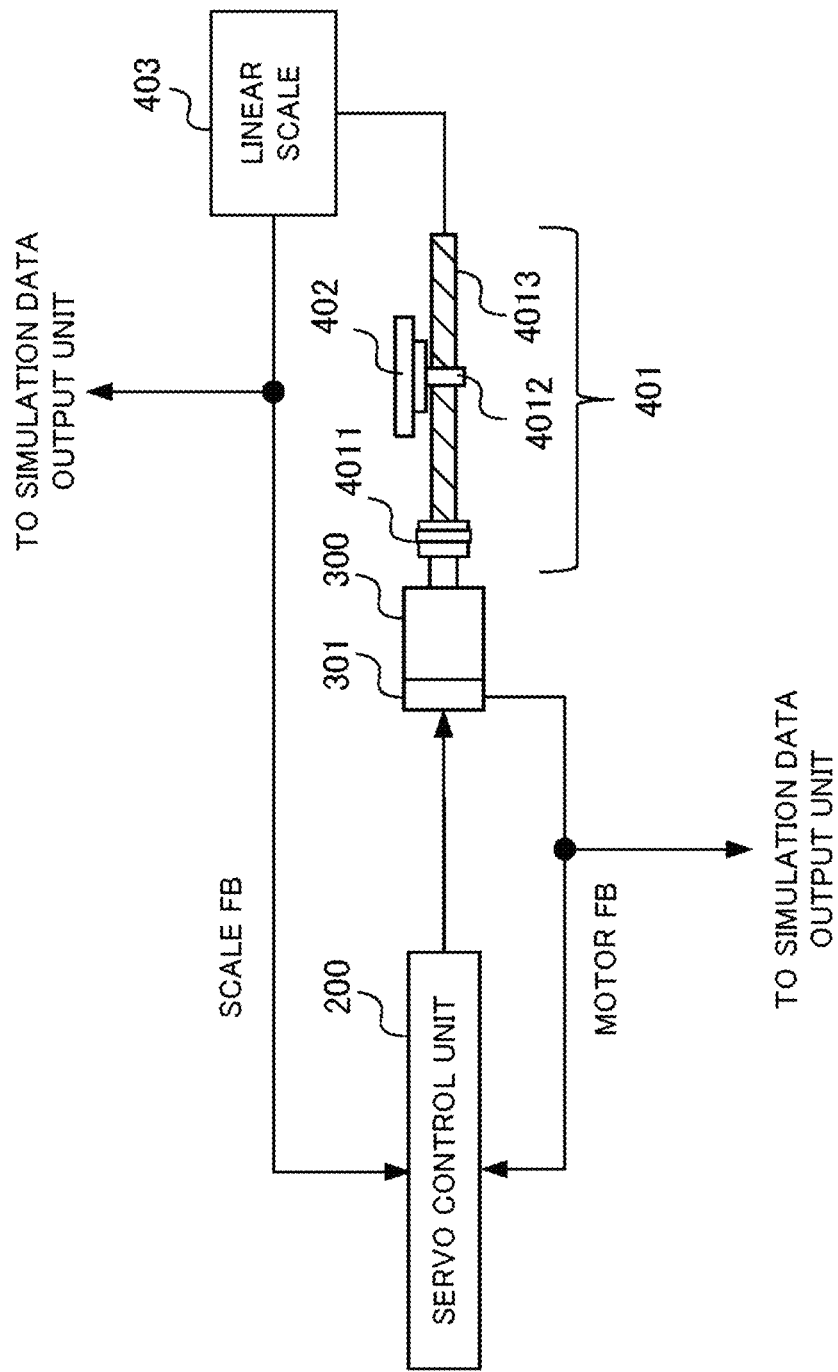
FIG. 2 is a block diagram showing parts of a servo motor and a machine.

FIG. 2 is a block diagram illustrating parts of the servo motor and the machine. The servo control unit 200 moves a table 402 by the servo motor 300 via a coupling mechanism 401 so that a machining target (workpiece) placed on the table 402 is machined. The coupling mechanism 401 includes a coupling 4011 coupled to the servo motor 300, a ball screw 4013 (provided as a movable part) fixed to the coupling 4011, and a nut 4012 screwed on the ball screw 4013. When the servo motor 300 rotates, the nut 4012 screwed on the ball screw 4013 moves in an axial direction of the ball screw 4013. The coupling mechanism 401 and the table 402 are parts of the machine 400.

A rotation angle position of the servo motor 300 is detected by a rotary encoder 301, which is associated with the servo motor 300 and functions as a position detecting unit. The signal thus detected is subjected to integration to yield motor feedback information. The motor feedback information is outputted to the servo control unit 200 and the simulation data output unit 105. The scale feedback information is a position detection value obtained from a linear scale 403, which is attached to an end of the ball screw 4013 of the machine 400. The linear scale 403 detects the distance of the movement of the ball screw 4013. The linear scale 403 outputs the result to the servo control unit 200 as the scale feedback information and to the simulation data output unit 105 as position information of the ball screw 4013, which is the movable part of the machine 400.

The simulation unit 110 includes the storage units 111, 112, 113, and 114, a simulation start command unit 115, a shape simulation unit 116, a shape simulation display unit 117, an observation target location designation unit 118, a machined surface simulation unit 119, a machined surface simulation display unit 120, and a display setting designation unit 121.

As described above, the storage units 111, 112, 113, and 114 store the machining position data of the machining program, the machining position data outputted from the machine coordinate conversion unit 104, the machining position data outputted from the servo motor 300, and the machining position data outputted from the machine 400, respectively. The pieces of machining position data stored in the storage units 111, 112, 113, and 114 are in the common coordinate system.

When a simulation start request is inputted to the NC device 100, the simulation start command unit 115 first reads the machining position data of the machining program from the storage unit 111, and transmits the simulation start command as well as the machining position data of the machining program to the shape simulation unit 116. The machining position data to be read first is not limited to the machining position data stored in the storage unit 111. Any of the pieces of machining position data in the storage units 111 to 114 may be read first.

Upon reception of the simulation start command, the shape simulation unit 116 performs a shape simulation with use of the machining position data of the machining program, and transmits, to the shape simulation display unit 117, image information indicating the shape of the workpiece obtained as a result of the shape simulation.

Figure 3:
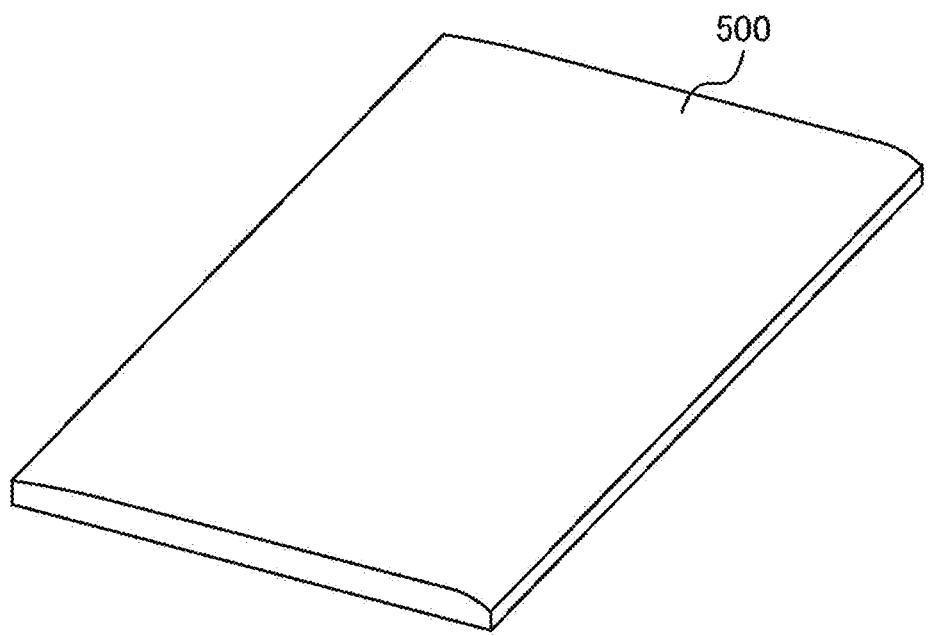
FIG. 3 is a view showing a workpiece displayed on a screen.
Figure 4:
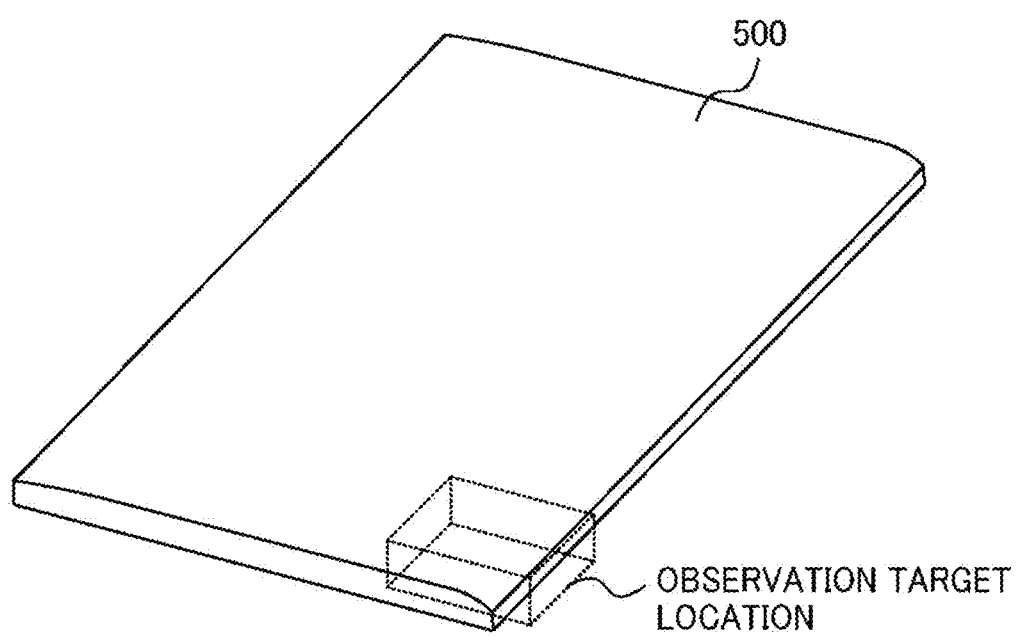
FIG. 4 is a view showing a designated observation target location in the workpiece.

The shape simulation display unit 117 displays, on a screen, the shape of the workpiece based on the image information indicating the shape of the workpiece. FIG. 3 is a view showing the workpiece displayed on the screen. A workpiece 500 corresponds to the workpiece obtained by the shape simulation performed with use of the machining position data of the machining program. The shape simulation display unit 117 is a liquid crystal display device with a touch panel, for example. If a user observes the workpiece actually machined by the machine 400 and finds an abnormality in the workpiece, the user operates the touch panel to designate a location to be observed (i.e., an observation target location) in the workpiece 500 shown in FIG. 3 to determine the cause of the problem. FIG. 4 is a view illustrating the designated observation target location in the workpiece 500.

The observation target location designation unit 118 transmits, to the machined surface simulation unit 119, coordinate information specifying the observation target location designated via the touch panel.

In cooperation with the simulation start command unit 115, the machined surface simulation unit 119 performs a simulation of a machined surface (hereinafter, referred to as a machined surface simulation) in the following manner.

Figure 5:
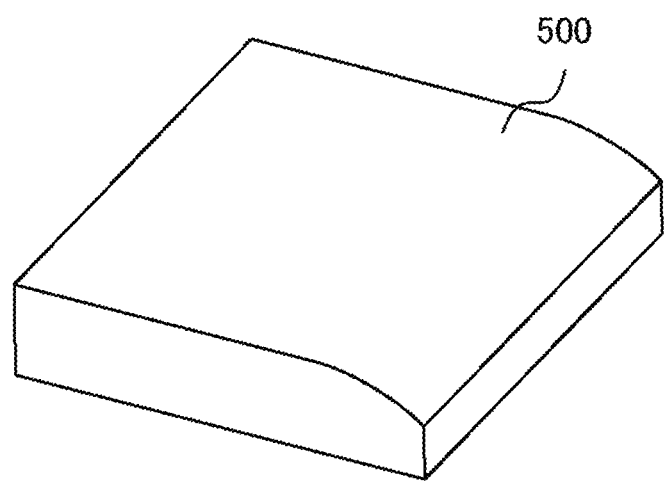
FIG. 5 is a partial perspective view showing a portion of the workpiece on which portion a machined surface simulation is to be executed.

The machined surface simulation unit 119 identifies machining position data for the observation target location based on the coordinate information, and first executes a first machined surface simulation. FIG. 5 is a partial perspective view illustrating a portion of the workpiece on which portion the machined surface simulation is to be executed.

Figure 6:
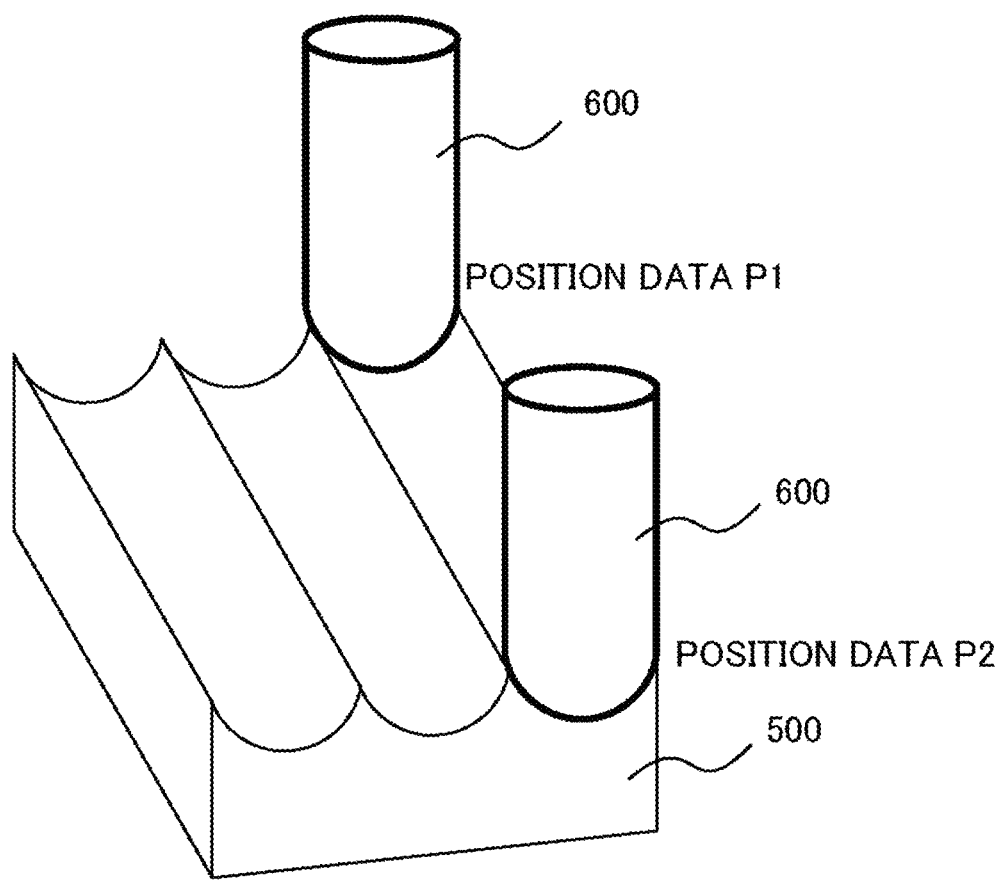
FIG. 6 is a view for explaining a machined surface simulation.

The machined surface simulation unit 119 reads the machining position data from the storage unit 111 or receives the machining position data from the simulation start command unit 115, and uses the machining position data in the first machined surface simulation. The first machined surface simulation is performed by calculating a portion to be cut based on the position data and tool information, as shown in FIG. 6. The tool information about a tool 600 includes information indicating a ball end mill and a ball radius R1 (in units of mm), for example. The position data includes position data P1 indicating X90.841 and position data P2 indicating X90.741, for example. FIG. 6 is a view for illustrating a machined surface simulation in which the ball end mill that is the tool 600 performs a cutting work on the workpiece 500 from the position corresponding to 90.841 in the X-axis direction to the position corresponding to 90.741 in the X-axis direction.

Upon completion of the first machined surface simulation performed with use of the machining position data of the machining program, the machined surface simulation unit 119 transmits a notification of completion of the first machined surface simulation to the simulation start command unit 115. The machined surface simulation unit 119 stores the result of the first machined surface simulation and the coordinate information indicating the observation target location.

Upon reception of the notification of completion of the first machined surface simulation, the simulation start command unit 115 reads, from the storage unit 112, the machining position data outputted from the machine coordinate conversion unit 104, and transmits the machining position data outputted from the machine coordinate conversion unit 104 to the machined surface simulation unit 119. Since the coordinate information indicating the observation target location is stored in the machined surface simulation unit 119, the shape simulation and designation of the observation target location are no longer necessary. Thus, the simulation start command unit 115 transmits the machining position data outputted from the machine coordinate conversion unit 104 directly to the machined surface simulation unit 119. Also in cases of third and fourth machined surface simulations (each will be described later), the shape simulation and designation of the observation target location are not necessary and thus the machining position data is directly outputted to the machined surface simulation unit 119. The machined surface simulation unit 119 executes the second machined surface simulation with use of the machining position data outputted from the machine coordinate conversion unit 104. Upon completion of the second machined surface simulation, the machined surface simulation unit 119 transmits a notification of completion of the second machined surface simulation to the simulation start command unit 115. The machined surface simulation unit 119 stores the result of the second machined surface simulation.

Upon reception of the notification of completion of the second machined surface simulation, the simulation start command unit 115 reads, from the storage unit 113, the machining position data outputted from the servo motor 300, and transmits the machining position data outputted from the machine coordinate conversion unit 300 to the machined surface simulation unit 119. The machined surface simulation unit 119 executes the third machined surface simulation with use of the machining position data outputted from the servo motor 300. Upon completion of the third machined surface simulation, the machined surface simulation unit 119 transmits a notification of completion of the third machined surface simulation to the simulation start command unit 115. The machined surface simulation unit 119 stores the result of the third machined surface simulation.

Upon reception of the notification of completion of the third machined surface simulation, the simulation start command unit 115 reads, from the storage unit 114, the machining position data outputted from the machine 400, and transmits the machining position data outputted from the machine 400 to the machined surface simulation unit 119. The machined surface simulation unit 119 executes the fourth machined surface simulation with use of the machining position data outputted from the machine 400. Then, the machined surface simulation unit 119 generates image information for laying out the results of the above-described first to fourth machined surface simulations on a single screen, and transmits the image information thus generated to the machined surface simulation display unit 120.

Figure 7:
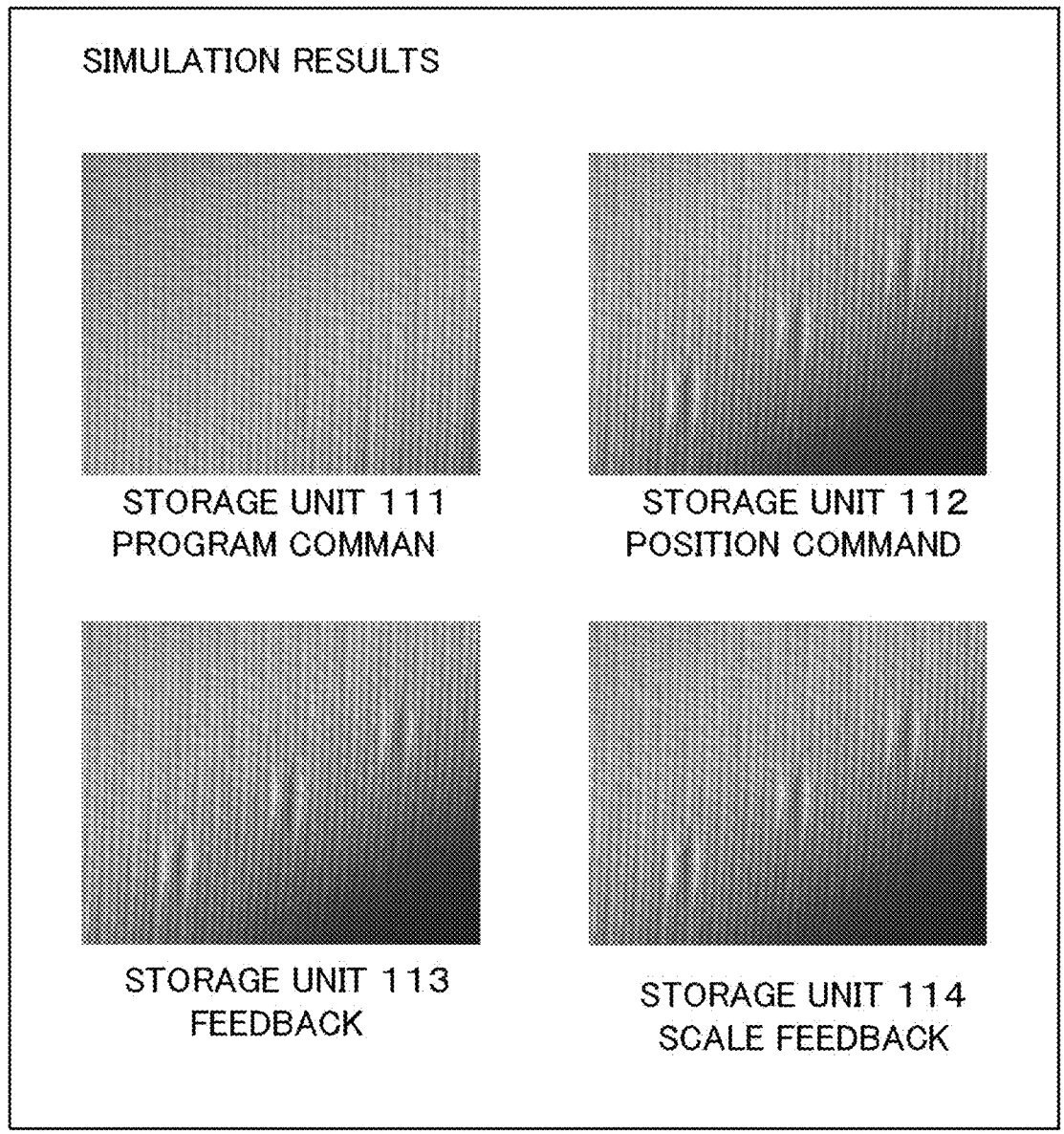
FIG. 7 is a view of the screen displaying the results of first to fourth machined surface simulations.

Based on the image information received from the machined surface simulation unit 119, the machined surface simulation display unit 120 displays, on the screen, the results of the first to fourth machined surface simulations. FIG. 7 is a view of the screen displaying the results of the first to fourth machined surface simulations. The screen in FIG. 7 shows information indicating the storage units 111, 112, 113, and 114, information indicating the types of pieces of machining position data stored in the storage units, and images showing the results of the machined surface simulations performed based on the pieces of machining position data. The machined surface simulation display unit 120 is a liquid crystal display device with a touch panel, for example. The liquid crystal display device with the touch panel used as the shape simulation display unit 117 may be used also as the machined surface simulation display unit 120.

The display setting designation unit 121 is used to adjust a display setting of the machined surface simulation display unit 120. The user uses the display setting designation unit 121 to adjust a display brightness, an irradiation angle, and an angle of sight for the observation target location of the first to fourth machined surface simulations. The user may use the display setting designation unit 121 also to select one or some of the results of the first to fourth machined surface simulations for displaying the selected one(s) of the results on the screen.

By checking the results of the first to fourth machined surface simulations displayed on the screen of the machined surface simulation display unit 120 shown in FIG. 7, the user finds that the machined surface simulation performed based on the machining position data read from the storage unit 111 does not show an abnormality, the machined surface simulation performed based on the machining position data read from the storage unit 112 shows an abnormality, and the machined surface simulations performed based on the pieces of machining position data read from the storage units 113 and 114 show similar abnormalities. From this, the user can determine that the abnormality on the machined surface of the workpiece has been caused by the position command, rather than by the program command. Despite the fact that the machined surface simulations based on the motor feedback and the scale feedback also show the machined surfaces with the abnormalities, it is possible to determine that the abnormality has been caused by the position command. This is because the abnormality on the machined surface shown by the machined surface simulation based on the position command is identical in location and shape to the actual abnormality.

Meanwhile, in a case where the machined surface simulations based on the pieces of machining position data read from the storage units 111 and 112 do not show an abnormality and the machined surface simulations based on the pieces of machining position data read from the storage units 113 and 114 show identical abnormalities, it is possible to determine that the abnormality on the machined surface of the workpiece has been caused by the servo control unit 200. Meanwhile, in a case where the machined surface simulations based on the pieces of machining position data read from the storage units 111, 112, and 113 do not show an abnormality and the machined surface simulation based on the piece of machining position data read from the storage unit 114 shows a similar abnormality, it is possible to determine that the abnormality on the machined surface of the workpiece has been caused by the machine 400.

In order to realize the functional blocks in the NC device 100 or in the simulation unit 110 shown in FIG. 1, the NC device 100 can be constituted by a computer including an arithmetic processing unit, such as a CPU (Central Processing Unit). The NC device 100 and the like also include an auxiliary memory, such as an HDD (Hard Disk Drive) storing various control programs including, e.g., application software and/or OS (Operating System), and a main memory, such as a RAM (Random Access Memory) for storing data temporarily required by the arithmetic processing unit to execute a program.

In the NC device 100 or the simulation unit 110, the arithmetic processing unit loads the application software and/or OS from the auxiliary memory, and deploys the application software and/or OS in the main memory to execute arithmetic processing according to the application software and/or OS. Based on the result of the arithmetic processing, various types of hardware in the NC device are controlled. In this manner, the functional blocks in the present embodiment are realized. That is, the present embodiment can be implemented by cooperation of hardware and software.

Figure 8:
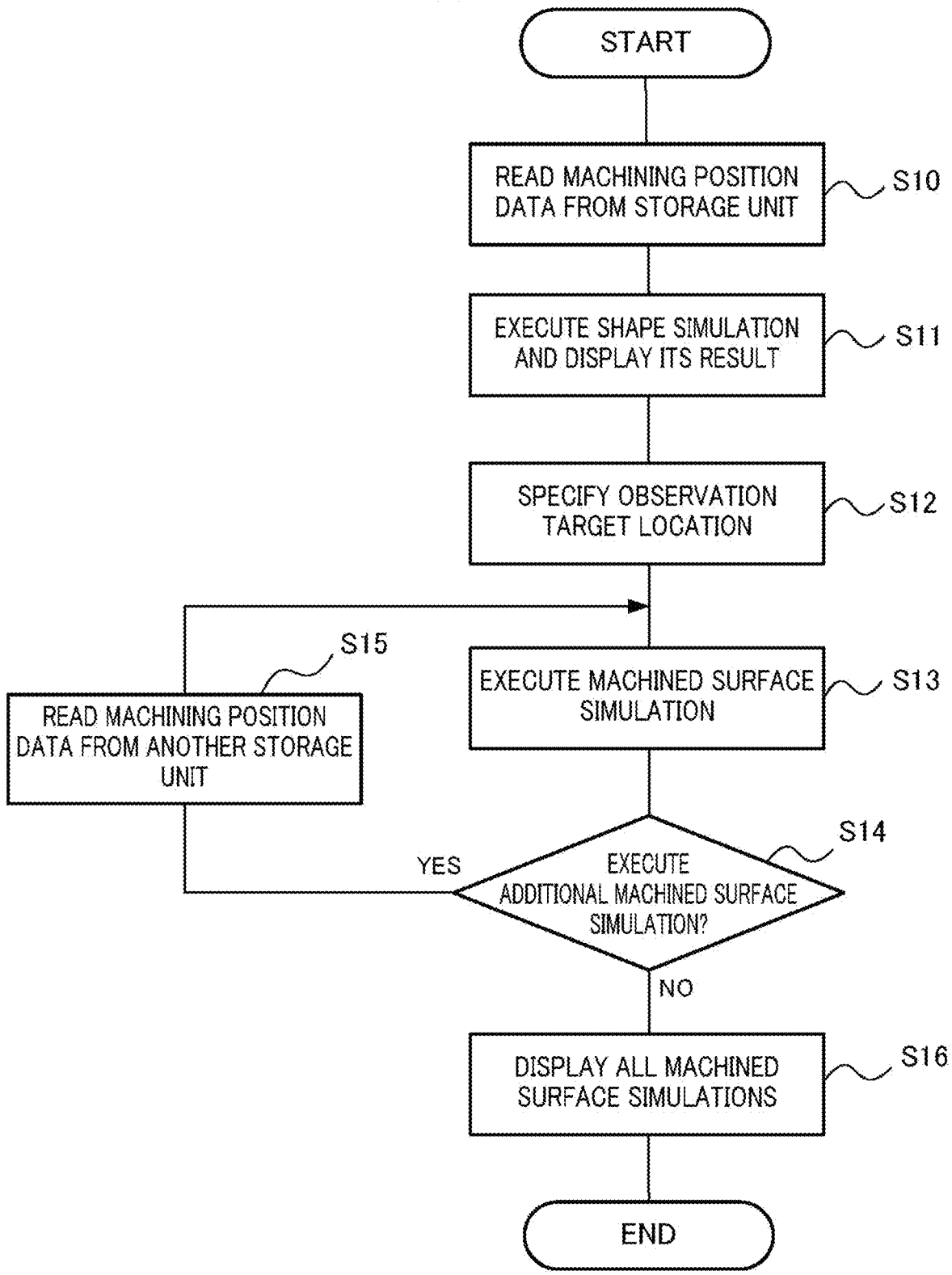
FIG. 8 is a flowchart showing how a simulation unit operates.

Next, with reference to FIG. 8, the following will describe how the simulation unit 110 operates. In step S10, when a simulation start request is inputted to the NC device 100, the simulation start command unit 115 reads, from the storage unit 111, the machining position data of the machining program. Then, the simulation start command unit 115 transmits, to the shape simulation unit 116, the simulation start command as well as the machining position data of the machining program.

In step S11, upon reception of the simulation start command, the shape simulation unit 116 performs a shape simulation with use of the machining position data of the machining program, and the shape simulation display unit 117 displays the shape of a workpiece on the screen based on image information indicating the shape of the workpiece.

In step S12, the observation target location designation unit 118 transmits, to the machined surface simulation unit 119, coordinate information for specifying an observation target location designated by the user.

In step S13, the machined surface simulation unit 119 identifies machining position data for the observation target location based on the coordinate information, and executes a machined surface simulation. The machined surface simulation performed for the first time corresponds to the above-described first machined surface simulation.

In step S14, the machined surface simulation unit 119 determines whether to execute an additional machined surface simulation after completion of the machined surface simulation. If the machined surface simulation unit 119 determines to execute the additional machined surface simulation (YES in step S14), the machined surface simulation unit 119 transmits a notice of completion of the machined surface simulation to the simulation start command unit 115. The number of times the machined surface simulation is to be performed is preset. The machined surface simulation unit 119 transmits a notification of completion of the machined surface simulation to the simulation start command unit 115 until the machined surface simulation is performed the set number of times. Since the number of storage units for storing the machining position data is four, first to fourth machined surface simulations are performed. In the case of the configuration shown in FIG. 1, the number of times the machined surface simulation is to be performed is four.

In step S15, upon reception of the notification of completion of the machined surface simulation, the simulation start command unit 115 reads machining position data for performing the additional machined surface simulation, and transmits the machining position data to the machined surface simulation unit 119. Then, the process returns to step S13. In a case where the notification of completion of the machined surface simulation is the notification of completion of the first machined surface simulation, the simulation start command unit 115 reads, from the storage unit 112, the machining position data outputted from the machine coordinate conversion unit 104, and transmits the machining position data outputted from the machine coordinate conversion unit 104 to the machined surface simulation unit 119.

Steps S13 to S15 are performed until the machined surface simulation is performed the set number of times. In the case of the configuration shown in FIG. 1, steps S13 to S15 are executed until the machined surface simulation is performed four times. In step S14, if the machined surface simulation unit 119 determines not to execute an additional machined surface simulation after completion of the machined surface simulation unit (NO in step S14), the process advances to step S16.

In step S16, the machined surface simulation unit 119 generates image information for laying out the results of all of the machined surface simulations on a single screen, and transmits the generated image information to the machined surface simulation display unit 120. The machined surface simulation display unit 120 displays the results of all of the machined surface simulations on the screen. In the case of the configuration shown in FIG. 1, the number of times the machined surface simulation is to be performed is four. Therefore, the results of all of the machined surface simulations are the results of the first to fourth machined surface simulations.

As described above, according to the present embodiment, merely by a single manipulation, it is possible to check the machined surfaces obtained as a result of the machined surface simulations based on all of the factors. This can reduce effort. In addition, by displaying the results of the machined surface simulations all at once, it is possible to easily determine at which stage and how the change has occurred. Thus, this configuration is particularly useful to determine the causative factor of a problem that has occurred on a machined surface.

(Variation)

Figure 9:
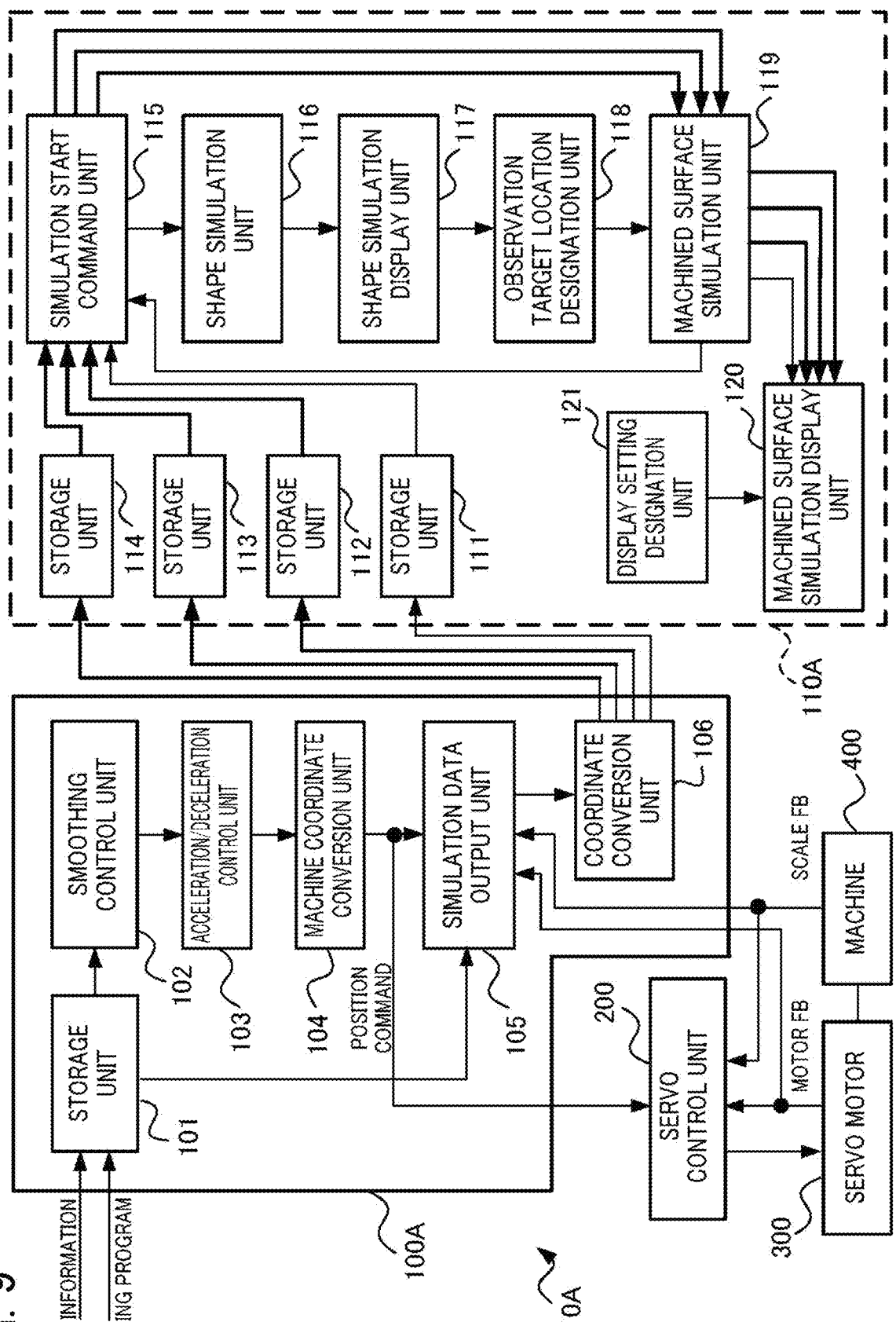
FIG. 9 is a block diagram showing a variation of a numerical control machine system of the present invention.

The foregoing description of the first embodiment has dealt with an example in which the NC device 100 includes the simulation unit 110. Alternatively, however, the simulation unit 110 may be provided outside the NC device 100. FIG. 9 is a block diagram illustrating a variation of the numerical control machine system of the present invention. As shown in FIG. 9, an NC machine system 10A includes an NC device 100A, a simulation device 110A, a servo control unit 200, a servo motor 300, and a machine 400. In the NC machine system 10A, the simulation device 110A is provided outside the NC device 100A. The NC device 100A corresponds to the NC device 100 of FIG. 1 from which the simulation unit 110 is eliminated.

The NC device 100A and the simulation device 110A can be connected to each other over a network. For example, the network may be LAN (Local Area Network) configured in a factory, the Internet, a public switched telephone network, or a combination thereof. There is no particular limitation on a specific communication system in the network. Also, there is no particular limitation on whether connection is made via wireless connection or wired connection.

The NC device 100A may be included in the machine 400. The servo motor 300 may also be included in the machine 400. A configuration of the simulation device 110A is identical to that of the simulation unit 110. Constituent elements of the simulation device 110A may be partially provided in the NC device 100A. For example, the storage units 111 to 114 may be provided in the NC device 100A. The simulation device 110A may be constituted by an information processing unit, such as a personal computer (PC) and/or a server.

Second Embodiment

In the first embodiment, machining is performed under the same condition, and machining position data of the machining program, machining position data outputted from the machine coordinate conversion unit 104, machining position data outputted from the servo motor 300, and machining position data outputted from the machine 400 are stored in the storage units 111, 112, 113, and 114, respectively. In the first embodiment, machined surface simulations are performed based on these pieces of machining position data, and a comparison is made between the results of the machined surface simulations. In the second embodiment, machining is performed more than once under different conditions, and pieces of machining position data related to a factor to be checked, e.g., pieces of machining position data outputted from the machine coordinate conversion unit 104 are stored for each condition in storage units. In the second embodiment, machined surface simulations are performed based on these pieces of machining position data, and a comparison is made between the results of the machined surface simulations. Specifically, in the NC machine system 10 shown in FIG. 1, an acceleration/deceleration of the acceleration/deceleration control unit 103 is changed, and then pieces of machining position data outputted from the machine coordinate conversion unit 104 are stored in the storage units 111 and 112. The machining position data before the adjustment of the acceleration/deceleration is stored in the storage unit 111, whereas the machining position data after the adjustment for reducing the acceleration/deceleration is stored in the storage unit 112. Then, according to steps S10 to S12 in the flowchart shown in FIG. 8, a shape simulation is executed and an observation target location is designated. Thereafter, according to steps S13 to S16 in the flowchart shown in FIG. 8, a machined surface simulation is executed based on the machining position data stored in the storage unit 111, a machined surface simulation is executed based on the machining position data stored in the storage unit 112, and the results of the two machined surface simulations are displayed on the screen of the machined surface simulation display unit 120. FIG. 10 is a view of the screen displaying the results of the machined surface simulations performed with use of the pieces of machining position data stored in the storage units 111 and 112. The screen in FIG. 10 shows information indicating the storage units 111 and 112, information indicating the types (before the adjustment of the acceleration/deceleration, after the adjustment of the acceleration/deceleration) of pieces of machining position data stored in the storage units 111 and 112, and images showing the results of the machined surface simulations performed based on the pieces of machining position data. FIG. 10 also shows information about the storage units 113 and 114. However, the storage units 113 and 114 do not store any machining position data. Therefore, on the screen, the letters "N/A" are indicated in the areas for indicating the types of machining position data in the storage units 113 and 114, and no image is displayed in the image display areas for the storage units 113 and 114. The number of times the condition can be changed is not limited to one. For example, the acceleration/deceleration may be adjusted again for a second time in the following manner. That is, the acceleration/deceleration of the acceleration/deceleration control unit 103 is changed, and machining position data outputted from the machine coordinate conversion unit 104 is stored in the storage unit 113. Then, the screen in FIG. 10 shows information indicating the storage unit 113, information indicating the type (after the second adjustment of the acceleration/deceleration) of machining position data stored in the storage unit 113, and an image showing the result of the machined surface simulation performed based on the machining position data.

By checking the results of the machined surface simulations performed before and after the adjustment of the acceleration/deceleration displayed on the screen of the machined surface simulation display unit 120 shown in FIG. 10, the user can find that an abnormality exists on the machined surface resulting from the machined surface simulation before the adjustment of the acceleration/deceleration but this abnormality no longer exists on the machined surface resulting from the machined surface simulation after the adjustment of the acceleration/deceleration. From this, the user can determine that the adjustment of the acceleration/deceleration is effective. As described above, according to the present embodiment, merely by a single manipulation on a location to be observed, it is possible to perform the machined surface simulations on the same location at once and to easily make a comparison between the machined surfaces thus obtained. Consequently, it is possible to easily check the effectiveness of an adjustment of a factor.

The foregoing has explained the embodiments according to the present invention. The constituent elements such as the NC device, the simulation unit included in the NC device, and the simulation device described above can be realized by hardware, software, or a combination thereof. Also, the machining simulation method performed by cooperation of the constituent elements can be realized by hardware, software, or a combination thereof. When the matter(s) described above is realized by software, this means that the matter(s) is achieved by a computer loading and executing a program.

The programs can be stored by way of various types of non-transitory computer readable media, and can be supplied to the computer. Examples of the non-transitory computer readable media encompass various types of tangible storage media. Examples of the non-transitory computer readable media encompass magnetic recording media (e.g., a hard disk drive), magneto-optic recording media (e.g., a magneto-optic disk), CD-ROM (Read Only Memory), CD-R, CD-R/W, and semiconductor memories (e.g., mask ROM, PPROM (programmable ROM), EPROM (Erasable ROM), flash ROM, and RAM (Random Access Memory)).

The embodiments described above are preferred embodiments of the present invention. However, the scope of the present invention is not limited only to the embodiments. The embodiments can be modified in various ways without departing from the gist of the present invention. For example, although the machined surface simulations are performed with use of the four pieces of machining position data in the first embodiment, two or three may alternatively be selected from the four pieces of machining position data as needed. For another example, although the machined surface simulations are performed by adjusting the acceleration/deceleration of the acceleration/deceleration control unit 103 in the second embodiment, machined surface simulations may alternatively be performed by adjusting the route in the smoothing control unit 102 to yield a smoother route and a comparison may be made between the machined surfaces resulting from the machined surface simulations before and after the adjustment. For a further example, in the second embodiment, machined surface simulations may alternatively be performed by adjusting a coefficient of position feed-forward, a coefficient of speed feed-forward, or the like of the servo control unit 200 and a comparison may be made between the machined surfaces resulting from the machined surface simulations before and after the adjustment.

The simulation device, the numerical control device, and the simulation method according to the present disclosure can encompass the above-described embodiments as well as various embodiments having the following features.

(1) A first aspect of the present disclosure is directed to a simulation device (e.g., the simulation unit 110, the simulation device 110A) including: plural storage units (e.g., the storage units 111 to 114) configured to store plural pieces of machining position data obtained from at least two of a machining program, a control command for performing servo control on a servo motor configured to drive a machine tool, and pieces of feedback information from the servo motor and the machine tool, which are for the machining tool to perform machining on a machining target;
a machined surface simulation unit (e.g., the machined surface simulation unit 119) configured to perform plural machined surface simulations based on the plural pieces of machining position data having been stored; and
a display unit configured to display images of machined surfaces in a juxtaposed manner, the images of the machined surfaces being obtained as a result of the plural machined surface simulations. According to such a simulation device, in the case of determining, by means of the machined surface simulation, the causative factor of an abnormality on a machined surface of a machined workpiece from among a plurality of factors, i.e., the machining program, the control command for performing the servo control on the servo motor configured to drive the machine tool, the servo control, and the machine operation, it is possible to easily determine the causative factor.

(2) A second aspect of the present disclosure is directed to a simulation device (e.g., the simulation unit 110, the simulation device 110A) including: plural storage units (e.g., the storage units 111 to 114) configured to store plural pieces of machining position data obtained from one of a machining program, a control command for performing servo control on a servo motor configured to drive a machine tool, and pieces of feedback information from the servo motor and the machine tool, which are for the machining tool to perform machining on a machining target more than once under different conditions;
a machined surface simulation unit (e.g., the machined surface simulation unit 119) configured to perform plural machined surface simulations based on the plural pieces of machining position data having been stored; and
a display unit configured to display images of machined surfaces in a juxtaposed manner, the images of the machined surfaces being obtained as a result of the plural machined surface simulations. According to such a simulation device, in the case of adjusting any of the machining program, the control command for performing the servo control on the servo motor configured to drive the machine tool, the servo control, and the machine operation and checking the effectiveness of the adjustment by means of the machined surface simulation, it is possible to easily check the effectiveness of the adjustment.

(3) The simulation device of (1) is configured such that the plural pieces of machining position data stored in the plural storage units are in a common coordinate system.

(4) The simulation device of any one of (1) to (3) is configured to further include a shape simulation unit (e.g., the shape simulation unit 116) configured to perform a shape simulation on the machining target based on one of the pieces of machining position data having been stored, wherein the machined surface simulation unit is further configured to perform the machined surface simulations on an observation target location in a machined surface of the machining target, the observation target location being designated based on a shape of the machining target given by the shape simulation unit.

(5) A third aspect of the present disclosure is directed to a numerical control device including: a simulation device of any one of (1) to (4); and a control unit (e.g., the smoothing control unit 102 and the acceleration/deceleration control unit 103) configured to generate a control command for performing servo control on a servo motor according to a machining program.

(6) The numerical control device of (5) further includes a coordinate conversion unit (e.g., the coordinate conversion unit 106) configured to convert pieces of machining position data in different coordinate systems into pieces of machining position data in a common coordinate system, wherein the pieces of machining position data stored in the storage units are the pieces of machining position data in the common coordinate system obtained as a result of the conversion performed by the coordinate conversion unit.

(7) A fourth aspect of the present disclosure is directed to a simulation method using a simulation device that includes storage units (e.g., the storage units 111 to 114) configured to store plural pieces of machining position data obtained from at least two of a machining program, a control command for performing servo control on a servo motor configured to drive a machine tool, and pieces of feedback information from the servo motor and the machine tool, which are for the machining tool to perform machining on a machining target, the simulation method including:
performing plural machined surface simulations based on the plural pieces of machining position data having been stored; and
displaying images of machined surfaces in a juxtaposed manner, the images of the machined surfaces being obtained as a result of the plural machined surface simulations. According to such a simulation method, in the case of determining, by means of the machined surface simulation, the causative factor of an abnormality on a machined surface of a machined workpiece from among a plurality of factors, i.e., the machining program, the control command for performing the servo control on the servo motor configured to drive the machine tool, the servo control, and the machine operation, it is possible to easily determine the causative factor.

(8) A fifth aspect of the present disclosure is directed to a simulation method using a simulation device that includes storage units (e.g., the storage units 111 to 114) configured to store plural pieces of machining position data obtained from one of a machining program, a control command for performing servo control on a servo motor configured to drive a machine tool, and pieces of feedback information from the servo motor and the machine tool, which are for the machining tool to perform machining on a machining target more than once under different condition, the simulation method including: performing plural machined surface simulations based on the plural pieces of machining position data having been stored; and
displaying images of machined surfaces in a juxtaposed manner, the images of the machined surfaces being obtained as a result of the plural machined surface simulations. According to such a simulation method, in the case of adjusting any of the machining program, the control command for performing the servo control on the servo motor configured to drive the machine tool, the servo control, and the machine operation and checking the effectiveness of the adjustment by means of the machined surface simulation, it is possible to easily check the effectiveness of the adjustment.

EXPLANATION OF REFERENCE NUMERALS 10, 10A NC machine system
100, 100A NC device
110 simulation unit
110A simulation device
111 storage unit
112 storage unit
113 storage unit
114 storage unit
115 simulation start command unit
116 shape simulation unit
117 shape simulation display unit
118 observation target location designation unit
119 machined surface simulation unit
120 machined surface simulation display unit
121 display setting designation unit
200 servo control unit
300 servo motor
400 machine

What is claimed is:

1. A simulation device comprising: storage units configured to store a plurality of pieces of machining position data obtained from at least two of a machining program, a control command for performing servo control on a servo motor configured to drive a machine tool, and pieces of feedback information from the servo motor and the machine tool, which are for the machining tool to perform machining on a machining target;
a machined surface simulation unit configured to perform a plurality of machined surface simulations based on the plurality of pieces of machining position data having been stored; and
a display unit configured to display images of machined surfaces in a juxtaposed manner, the images of the machined surfaces being obtained as a result of the plurality of machined surface simulations.

2. The simulation device according to claim 1, wherein the plurality of pieces of machining position data stored in the storage units are in a common coordinate system.

3. The simulation device according to claim 1, further comprising a shape simulation unit configured to perform a shape simulation on the machining target based on one of the plurality of pieces of machining position data having been stored, wherein
the machined surface simulation unit is further configured to perform the machined surface simulations on an observation target location in a machined surface of the machining target, the observation target location being designated based on a shape of the machining target given by the shape simulation unit.

4. A numerical control device comprising: the simulation device according to claim 1;
and a control unit configured to generate a control command for performing servo control on the servo motor according to a machining program.

5. The numerical control device according to claim 4, further comprising a coordinate conversion unit configured to convert pieces of machining position data in different coordinate systems into pieces of machining position data in a common coordinate system, wherein the pieces of machining position data stored in the storage units are the pieces of machining position data in the common coordinate system obtained as a result of the conversion performed by the coordinate conversion unit.

6. A simulation device comprising: storage units configured to store a plurality of pieces of machining position data obtained from one of a machining program, a control command for performing servo control on a servo motor configured to drive a machine tool, and pieces of feedback information from the servo motor and the machine tool, which are for the machining tool to perform machining on a machining target more than once under different conditions;
a machined surface simulation unit configured to perform a plurality of machined surface simulations based on the plurality of pieces of machining position data having been stored; and
a display unit configured to display images of machined surfaces in a juxtaposed manner, the images of the machined surfaces being obtained as a result of the plurality of machined surface simulations.

7. The simulation device according to claim 6, further comprising a shape simulation unit configured to perform a shape simulation on the machining target based on one of the plurality of pieces of machining position data having been stored, wherein
the machined surface simulation unit is further configured to perform the machined surface simulations on an observation target location in a machined surface of the machining target, the observation target location being designated based on a shape of the machining target given by the shape simulation unit.

8. A numerical control device comprising: the simulation device according to claim 6; and a control unit configured to generate a control command for performing servo control on the servo motor according to a machining program.

9. The numerical control device according to claim 8, further comprising a coordinate conversion unit configured to convert pieces of machining position data in different coordinate systems into pieces of machining position data in a common coordinate system, wherein the pieces of machining position data stored in the storage units are the pieces of machining position data in the common coordinate system obtained as a result of the conversion performed by the coordinate conversion unit.

10. A simulation method using a simulation device that includes storage units configured to store a plurality of pieces of machining position data obtained from at least two of a machining program, a control command for performing servo control on a servo motor configured to drive a machine tool, and pieces of feedback information from the servo motor and the machine tool, which are for the machining tool to perform machining on a machining target, the simulation method comprising:
performing a plurality of machined surface simulations based on the plurality of pieces of machining position data having been stored; and
displaying images of machined surfaces in a juxtaposed manner, the images of the machined surfaces being obtained as a result of the plurality of machined surface simulations.

11. A simulation method using a simulation device that includes storage units configured to store a plurality of pieces of machining position data obtained from one of a machining program, a control command for performing servo control on a servo motor configured to drive a machine tool, and pieces of feedback information from the servo motor and the machine tool, which are for the machining tool to perform machining on a machining target more than once under different conditions, the simulation method comprising:
performing a plurality of machined surface simulations based on the plurality of pieces of machining position data having been stored; and
displaying images of machined surfaces in a juxtaposed manner, the images of the machined surfaces being obtained as a result of the plurality of machined surface simulations.

* * * * *